United States Patent
Uhlmann et al.

(10) Patent No.: US 8,645,496 B2
(45) Date of Patent: *Feb. 4, 2014

(54) SYSTEMS AND METHODS FOR BACKING UP DATA

(75) Inventors: Carolina P. Uhlmann, Seattle, WA (US); Eric A. Herrmann, Snohomish, WA (US); Dianne C. Thompson, Bellevue, WA (US); Janet L. Schneider, Bellevue, WA (US)

(73) Assignee: EMC Corporation, Hopkinton, MA (US)

( * ) Notice: Subject to any disclaimer, the term of this patent is extended or adjusted under 35 U.S.C. 154(b) by 3129 days.

This patent is subject to a terminal disclaimer.

(21) Appl. No.: 10/935,552

(22) Filed: Sep. 7, 2004

(65) Prior Publication Data

US 2006/0053333 A1 Mar. 9, 2006

(51) Int. Cl.
| G06F 15/16 | (2006.01) |
| G06F 15/173 | (2006.01) |
| G06F 13/00 | (2006.01) |
| G06F 11/00 | (2006.01) |

(52) U.S. Cl.
USPC ........... 709/219; 709/223; 711/162; 714/4.11

(58) Field of Classification Search
USPC ............................................. 709/224; 714/2
See application file for complete search history.

(56) References Cited

U.S. PATENT DOCUMENTS

| 6,243,824 B1 | 6/2001 | Kakuta | |
| 6,732,125 B1 * | 5/2004 | Autrey et al. | 707/204 |
| 6,799,258 B1 * | 9/2004 | Linde | 711/162 |
| 6,865,655 B1 | 3/2005 | Andersen | |
| 6,910,112 B2 | 6/2005 | Berkowitz et al. | |
| 6,948,038 B2 | 9/2005 | Berkowitz et al. | |
| 7,162,599 B2 | 1/2007 | Berkowitz et al. | |
| 7,237,045 B2 * | 6/2007 | Beckmann et al. | 710/38 |
| 7,237,076 B2 * | 6/2007 | Nakano et al. | 711/162 |
| 7,246,211 B1 * | 7/2007 | Beloussov et al. | 711/162 |
| 2003/0158861 A1 * | 8/2003 | Sawdon et al. | 707/200 |
| 2003/0158862 A1 * | 8/2003 | Eshel et al. | 707/200 |
| 2003/0182301 A1 | 9/2003 | Patterson et al. | |
| 2004/0010487 A1 | 1/2004 | Prahlad et al. | |
| 2004/0133588 A1 * | 7/2004 | Kiessig et al. | 707/102 |
| 2004/0141498 A1 * | 7/2004 | Rangan et al. | 370/380 |
| 2004/0236916 A1 | 11/2004 | Berkowitz et al. | |

(Continued)

FOREIGN PATENT DOCUMENTS

CN 1575568 2/2005

OTHER PUBLICATIONS

How VERITAS Storage Foundation TM for Windows Integrates with and Enhances Windows Server 2003 Volume Shadow Copy Service. VERITAS Software Corporation. Nov. 20, 2003.

(Continued)

*Primary Examiner* — Ranodhi Serrao
(74) *Attorney, Agent, or Firm* — Workman Nydegger

(57) ABSTRACT

Systems and methods for backing up data of a client. In a system that includes clients in communication with a server, the data of the client is backed up by first enumerating writers that are active on a client. Metadata from the active writers is received and identifies data to be backed up. A snapshot of the client is taken and the client data identified in the metadata received from the writers is backed up from the snapshot.

22 Claims, 3 Drawing Sheets

(56) References Cited

U.S. PATENT DOCUMENTS

| | | | |
|---|---|---|---|
| 2004/0250033 | A1 | 12/2004 | Prahlad et al. |
| 2005/0015663 | A1 | 1/2005 | Armangau et al. |
| 2005/0028022 | A1 | 2/2005 | Amano |
| 2005/0081099 | A1 | 4/2005 | Chang et al. |
| 2005/0273557 | A1* | 12/2005 | Tabuchi et al. ............ 711/114 |
| 2006/0053332 | A1 | 3/2006 | Uhlmann et al. |
| 2007/0005914 | A1 | 1/2007 | Thompson et al. |
| 2007/0005915 | A1 | 1/2007 | Thompson et al. |
| 2007/0006017 | A1 | 1/2007 | Thompson et al. |
| 2007/0006018 | A1 | 1/2007 | Thompson et al. |

OTHER PUBLICATIONS

Legato NetWorker Administrator's Guide Release 6.0. Legato Systems, Inc. Aug. 2000. pp. 276, 312, 502.
Paragon Drive Backup Enterprise Server Edition, Best Practices for MS Exchange Server. [retrieved on Aug. 8, 2007 from the Internet] <URL:http://download.paragon-software.com/doc/Best_Practices_MS_Exchange_Server.pdf>.
VERITAS Backup Exec 9.1 for Windows Servers. VERITAS Software Corporation. Jan. 21, 2004.
Sankaran, Guinn, Nguyen. "Volume Shadow Copy Service Helps Build an Integrated Backup System". Power Solutions. Mar. 2004.
Symantec Backup Exec Quick Recovery and Off-Host Backup Solutions. Symantec. Jan. 2007.
Quick Recovery for Microsoft Exchange 2003 using VERITAS Storage Foundation for Microsoft Windows and HP Storage—white paper. Hewlett-Packard Development Company, L.P. Sep. 2004.
Why Windows Storage Server 2003 for your NAS Solution? Microsoft Corporation 2002.
Backup and Restore Technologies. Jun. 18, 2003 [retrieved on Aug. 8, 2007]. Retrieved from the Internet <URL:http://searchwincomputing.techtarget.com/searchWinSystems/downloads/Naik_ch05.pdf>. pp. 137-173.
Sun StorEdge Enterprise Backup Software 7.1 Administrator's Guide. LEGATO Systems, Inc. Sep. 2003. pp. 1-2.
VERITAS Storage Foundation 4.0 for Windows Solutions Guide Windows Server 2003. VERITAS Software Corporation 2003. pp. 1-2.
VERITAS Storage Foundation 4.1 for Windows Solutions Guide Windows 2000, Windows Server 2003. VERITAS Software Corporation 2004. pp. 1-2.
VERITAS Storage Foundation 4.1 for Windows Administrator's Guide Windows 2000, Windows Server 2003. VERITAS Software Corporation 2004. pp. 1-2.
VERITAS Storage Foundation 4.1 for Windows Solution's Guide for Microsoft Exchange Server Windows 2000, Windows Server 2003. VERITAS Software Corporation May 2004. pp. 1-2.
How Volume Shadow Copy Service Works. Microsoft Corporation. [retrieved on Aug. 8, 2007] Retrieved from the Internet <URL:http// technet1.microsoft.com/windowsserver/en/library/2b0d2457-b7d8-42c3-b6c9-59c145b77651033,nsox?mfr=true>. Mar. 28, 2003.
Use of Components by the Requester (Windows). Microsoft Corporation. [retrieved on Aug. 8, 2007] Retrieved from the Internet <URL:http://msdn2.microsoft.com/en-us/library/aa384628.aspx>. Jul. 2, 2007.
IVssBackupComponents::AddComponent. Microsoft Corporation. [retrieved on Aug. 8, 2007 from the Internet] <URL:http://msdn2.microsoft.com/en-us/library/aa382646.aspx>. Jul. 2, 2007.
Overview of Actual File Restoration. Microsoft Corporation. [retrieved on Aug. 8, 2007 from the Internet] <URL:http://msdn2.microsoft.com/en-us/library/aa384575.aspx>. Jul. 2, 2007.
Overview of Actual Backup Initialization. Microsoft Corporation. [retrieved on Aug. 8, 2007 from the Internet] <URL:http://msdn2.microsoft.com/en-us/library/aa384577.aspx>. Jul. 2, 2007.
Overview of Processing a Restore under VSS. Microsoft Corporation. [retrieved on Aug. 8, 2007 from the Internet] <URL:http://msdn2.microsoftcom/en-us/library/aa384590.aspx>. Jul. 2, 2007.
Writer Metadata Document Life Cycle. Microsoft Corporation. [retrieved on Aug. 8, 2007 from the Internet] <URL:http://msdn2.microsoft.com/en-us/library/aa384998.aspx>. Jul. 2, 2007.
Overview of Restore Initialization. Microsoft Corporation. [retrieved on Aug. 8, 2007 from the Internet] <URL:http://msdn2.microsoft.com/en-us/library/aa384592.aspx>. Jul. 2, 2007.
Carolina P. Uhlmann, et al., U.S. Appl. No. 10/935,551, filed Sep. 7, 2004.
Microsoft Windows Server 2003. Introduction to Shadow Shared Folders. Microsoft Corporation. Mar. 2003. 15 pages.
Microsoft Windows Server 2003. Windows Server 2003 Active Directory Fast Recovery with Volume Shadow Copy Service and Virtual Disk Service. Microsoft Corporation. Aug. 2003. 16 Pages.
Microsoft Windows Storage Server 2003. NSI Software. NSI solutions with Microsoft VSS. Microsoft Coporation. Mar. 2004. 8 Pages.
U.S. Appl. No. 11/169,418, May 29, 2008, Advisory Action.
U.S. Appl. No. 11/169,418, Aug. 14, 2008, Office Action.
U.S. Appl. No. 11/169,418, Feb. 5, 2009, Final Office Action.
U.S. Appl. No. 11/169,418, Aug. 4, 2009, Office Action.
U.S. Appl. No. 11/169,418, Jan. 27, 2010, Notice of Allowance.
U.S. Appl. No. 11/169,419, Dec. 1, 2008, Final Office Action.
U.S. Appl. No. 11/169,419, Jun. 11, 2009, Office Action.
U.S. Appl. No. 11/169,419, Feb. 23, 2010, Final Office Action.
U.S. Appl. No. 11/169,419, Oct. 29, 2010, Office Action.
U.S. Appl. No. 11/169,419, May 13, 2011, Notice of Allowance.
U.S. Appl. No. 11/170,015, Nov. 1, 2007, Final Office Action.
U.S. Appl. No. 11/170,015, Apr. 1, 2008, Advisory Action.
U.S. Appl. No. 11/170,015, Dec. 16, 2008, Notice of Allowance.
U.S. Appl. No. 11/169,853, Nov. 1, 2007, Final Office Action.
U.S. Appl. No. 11/169,853, Feb. 21, 2008, Advisory Action.
U.S. Appl. No. 11/169,853, Feb. 11, 2009, Notice of Allowance.

* cited by examiner

SYSTEMS AND METHODS FOR BACKING UP DATA

CROSS-REFERENCE TO RELATED APPLICATIONS

Not applicable.

BACKGROUND OF THE INVENTION

1. The Field of the Invention

The present invention relates to systems and methods for backing up data. More particularly, embodiments of the invention relate to systems and methods for backing up data that includes active applications and operating systems.

2. Background and Relevant Art

Computer networks have become an integral part of modern life. The Internet is ubiquitous in both homes and corporate networks. Many corporate entities also use local area networks (LANs) within their own organizations in addition to providing consumers with access to some data over the Internet.

Because of the dependence on computer networks and on computers themselves, a premium is placed on the availability and reliability of data. For many corporate enterprises, essentially all corporate data is stored on a computer network and access to the data is expected at any time. The demand for uninterrupted access to data corresponds to a need for software and hardware that can meet the demand to provide data and services. At the same time, the demand for access to data and the quantity of data has made it increasingly difficult to protect the data from events such as system failures, viruses, power outages, etc.

In view of these potential problems, it is imperative that the data be protected. This is typically accomplished through the use of software that backs up the data. As the amount of data continues to increase, backing up the data becomes more complex. Gigabytes of data cannot currently be quickly transferred from one volume to a backup volume and taking a volume of data offline for backup purposes is an unattractive option.

Backing up large amounts of data, however, is not the only problem related to back up software. It is often necessary to also back up other types of data, such as applications and services. However, applications and services often have open files when a backup is initiated. Open files generally cannot be effectively backed up using conventional systems, and are often skipped during backup operations. As a result, additional applications are often needed to help manage backups of open files and to administrate backup logs for files that were skipped during backup.

Operating systems present another challenge to software and systems that back up data. The complexity of operating systems often requires operating systems to be backed up in a logical unit to preserve the state of the system. A partial backup of an operating system may result in inconsistencies or system failure if the operating system is restored from a partial or incomplete backup. In other words, backing up the file system itself does not effectively back up the state of the system and may result in errors when recovered. Operating systems are also often used with databases or other volumes of data that need to be backed up while preserving the state of the system. In addition, operating systems as well as applications and services are often distributed across computer systems, a fact that complicates an effective backup of the data.

The desire to provide uninterrupted service combined with increased storage requirements creates the need for systems and methods for backing up data quickly and with minimal interruption to applications and services.

BRIEF DESCRIPTION OF THE DRAWINGS

In order to describe the manner in which the advantages and features of the invention can be obtained, a description of the invention will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Embodiments of the present invention relate to systems and methods for backing up data. As used herein, data may include, but is not limited to, user data, system data, applications, services, and/or operating systems. Embodiments of the invention enable a point in time copy of a complete system volume or of designated portion of a system volume to be backed up. Advantageously, the point in time copy includes useful backups of open files and also provides, when backing up an operating system, a backup of the state of the system.

When a backup is performed in accordance with the present invention, the system that is processing or controlling the storage of the data that is to be backed up (such as an application, service, or operating system) is directed to temporarily freeze or suspend operation. During the suspended operation, a virtual volume of the data is created. After the virtual volume is created, the application or service is directed to resume operation while the backup copy is made from the virtual volume.

One of the advantages afforded by embodiments of the invention is that the suspended operation allows open files to be captured and reflected in the virtual volume. Thus, open files are not skipped in the backup. Also, the service or application is notified before the creation of the virtual volume and is given time to pause and save data to disk. This ensures that the virtual volume is consistent.

Figure 3:
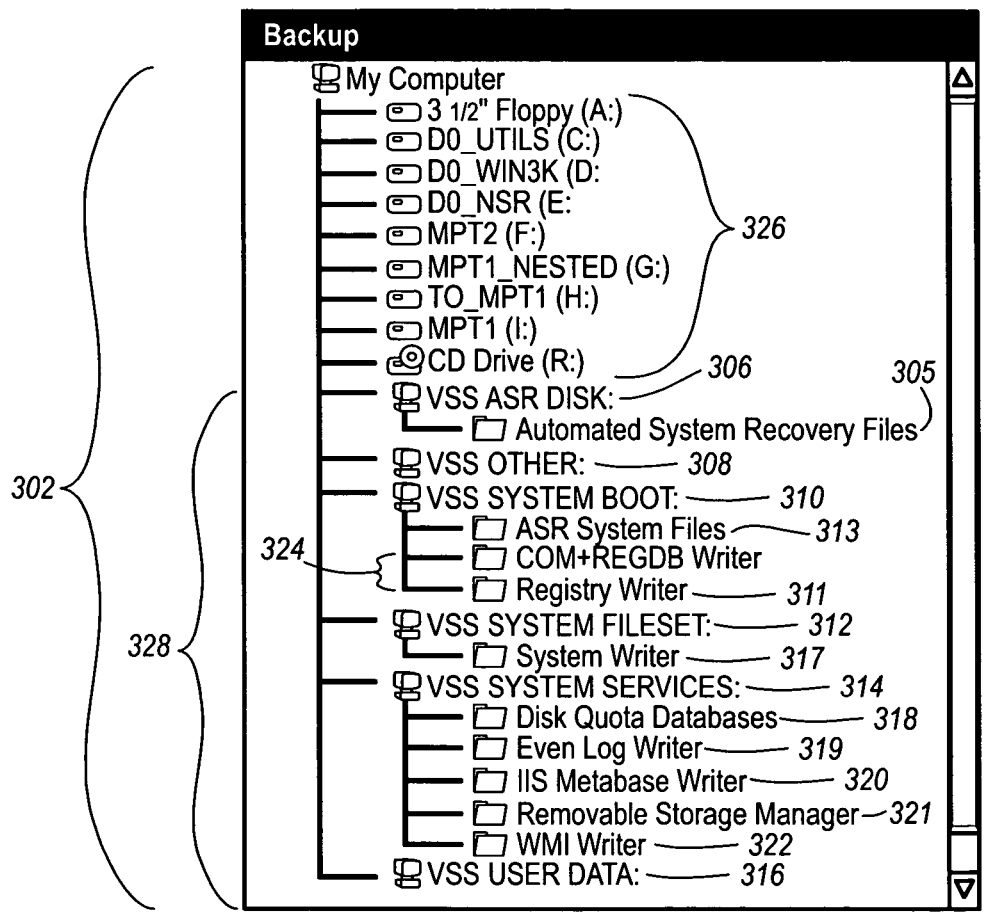
FIG. 3 illustrates examples of backup groupings that are dynamically generated to group writers by type.

One of the constructs used to ensure that a backup of data, such as an operating system, is maintained in a logical unit, is a backup grouping as described in greater detail in reference to FIG. 3. A backup grouping may refer to a volume or drive that is backed up by walking the directories of the volume. A backup grouping for a volume identifies the volume to be backed up. Other backup groupings may include information that identify the items or data that need to be backed up as well as identifying a restore method. Because the items identified in a backup grouping may be distributed, embodiments of the invention can walk through the items identified in the backup groupings to ensure that the corresponding data is properly backed up. In contrast, simply walking the directories and sub-directories of a file system does not typically backup an operating system as a logical unit. In other words, a conventional backup of a file system does not preserve the state of the system in the manner in which the methods of the invention can do so.

1. Overview of Exemplary Systems for Backing Up Data

Figure 1:
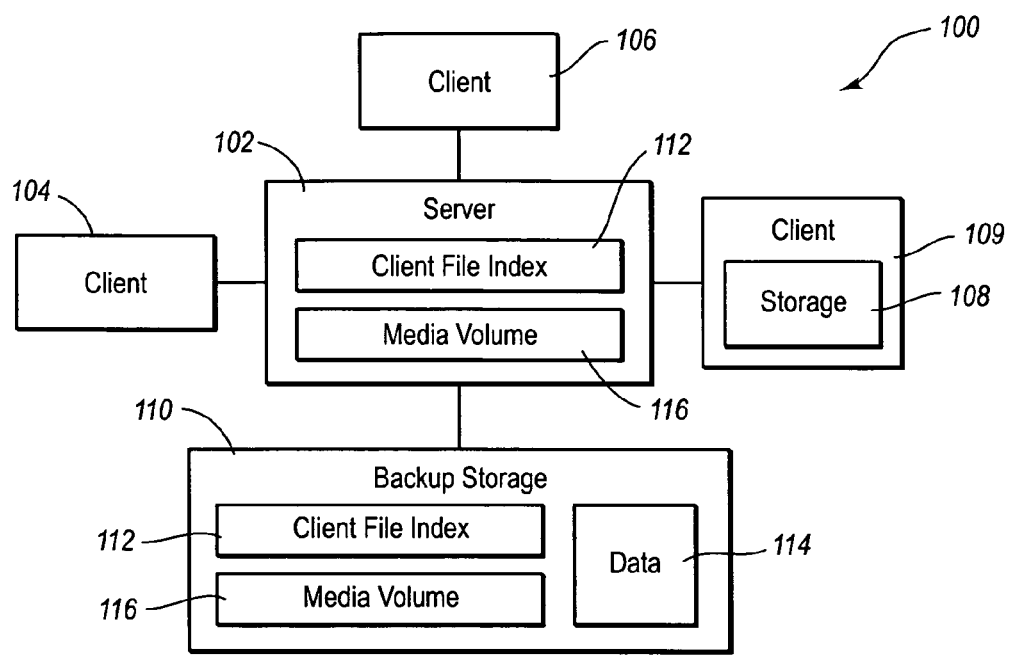
FIG. 1 illustrates an exemplary environment for implementing embodiments of the present invention.

FIG. 1 illustrates an exemplary system for backing up network data that can be adapted for use with the invention. Although the system of FIG. 1 can be used to back up data according to the invention, embodiments of the invention can also be practiced in other networks that have data to be backed up. FIG. 1 illustrates a server 102 that has a relationship with client(s) that are represented by the clients 104, 106, and 108. Each client 104, 106, and 108 may have data on a storage volume that is local with respect to the respective client. The storage volume may include different volumes or drives of the client as well as represent applications and services. The client 108, for instance, has storage 109 that contains data (e.g., including applications, services, and/or volumes). Also, services represent a type of application and may therefore be referred to as applications herein.

Thus, each client 104, 106, and 108 represents a system with data to be backed up. Each client can be relatively simple (e.g., a desktop computer) or relatively complex (e.g., a large database server or a cluster of servers). The client may further be a network or a storage area network (SAN). Each client 104, 106, and 108 may operate under a different operating system or platform than the server 102. In the context of a backup operation, a client may operate under the control of the server 102.

A user may establish a schedule that defines the times at which the server 102 automatically performs a backup operation on the data of clients 102, 104, and/or 106. However, users on the clients can also initiate a backup operation. In the example of FIG. 1, the server 102 has access to backup storage 110. The backup storage 110 can be integrated with the server 102 or may be distinct and separate from the server 102. The data 114 represents the data that has been backed up by the server 102 on the backup storage 110.

The server 102 typically controls and directs all server initiated backup operations or processes. The client controls ad hoc backup operations. Data is backed up, in one embodiment, using backup groupings. Each backup grouping is a collection of data or items that are backed up during a backup operation between the server 102 and a particular client or clients. A backup grouping can therefore include a group of files, an entire file system, application-generated data, such as a database or operating system information, and the like. A backup grouping may also include applications or services. As described below, a backup grouping may identify one or more writers, each corresponding to an application or service. The data associated with writers in a backup grouping may further be located in different directories, different volumes, and the like.

In certain types of data or items, such as operating systems, there are requirements that the operating system be backed up as a consistent unit. Other non-operating system specific applications or services may also have a similar requirement. In other words, an operating system may include files or databases that define the state of the client or system at any given time. Simply backing up contents of the file system may not capture the state of the client, as previously explained. When the server 102 performs a backup of an operating system, it usually ensures that the appropriate backup groupings associated with the operating system are backed up at the same time or together to ensure that the operating system is backed up as a consistent unit and that the state of the client or system is preserved in the backup copy of the client's data.

The server 102 also stores and manages a client file index 112 and a media volume 116 both on the server itself and on the backup storage 110. The client-file index 112 is an index of the backed up data items. The media volume 116 is an index of volumes. The client file index 112 and the media volume 116 are collectively referred to herein as the "online indexes". The online indexes are typically stored on the backup storage 110 after the backup operation is complete.

2. Backup Groupings Used with Application Writers

Figure 2:
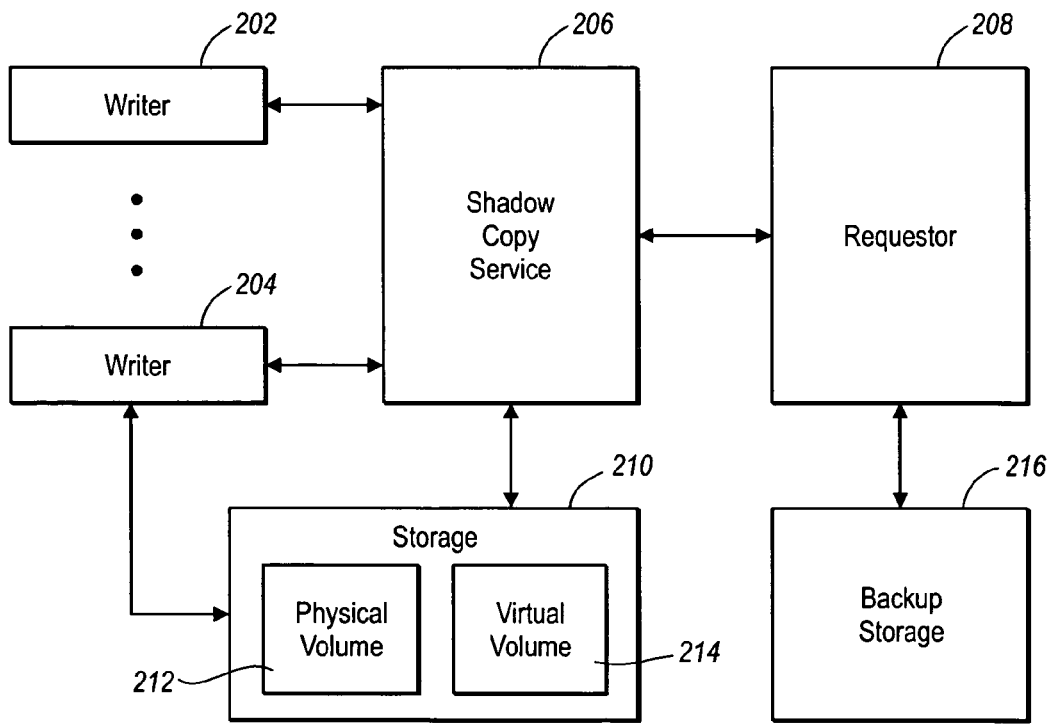
FIG. 2 illustrates an embodiment of a requestor that backs up data from a virtual volume using a copy service.

FIG. 2 illustrates an exemplary system for backing up data that operates according to embodiments of the invention. In FIG. 2, each writer, represented by the writers 202 and 204, is associated with an application or service and at least one backup grouping. The writers provide metadata that include the writer's name, items such as files and components to back up, what items or data are to be excluded from the backup, and the methods for handling components and applications during backup and restore. The writers 202, 204 also identify the type of application or service that is being backed up. A writer may be associated, for example, with a mail server, a database, or other application, service or data store. Although embodiments of the invention can be implemented in connection with substantially any operating systems and computers that provide writers or similar functionality, one example of an operating system that employs application writers is Windows 2003 and later Windows versions available from Microsoft Corporation of Redmond, Wash.

In FIG. 2, the shadow copy service 206 is a service that participates in the generation of a shadow copy or virtual volume of a particular set of data or volume. In one example, the virtual volume is generated for a particular backup grouping. As other backup groupings are processed, additional virtual volume(s) are generated as required. The requestor 208 (which, in one embodiment, is a backup process operating on a client) typically initiates a backup operation by querying the service 206 to obtain the needed information for the backup operation from the writers 202, 204. The writers generate the metadata and the requestor 208 receives the metadata from the writers 202, 204. The metadata is typically saved by the requestor 208 before backing up the items or data identified in the metadata.

In this example, the physical volume 212 corresponds to the data identified in at least one of the backup groupings of the requestor 208. As the backup operation continues, the writer may prepare the application for backup by ensuring that the storage 210 contains a consistent copy of the physical volume. This may include preventing new transactions from occurring, finishing existing transactions, and flushing any cache to disk or to the physical volume 212. After a consistent copy is stored in the physical volume 212, a virtual volume 214 is created, or updated in some cases, from changes that have occurred in the physical volume 212.

The virtual volume 214 is typically a snapshot of the physical volume. Because a snapshot is being created in the virtual volume 214, the time required to create the virtual volume 214 or the snapshot may be short compared to creating a backup of the entire physical volume 212. After the virtual volume 214 is completed, the application is released and can continue operation. The requester 208 makes or updates the backup in the backup storage 216 from the virtual volume 214.

More specifically, the requestor 208 asks the service 206 to identify the writers 202, 204 and to gather the metadata from the writers. In one embodiment, the service 206 only identifies active writers. The writers provide metadata to the requestor 208 that includes an XML description of the backup components and the restore method. Through the service 206, the requestor 208 can identify which volumes support a shadow copy for the volumes required by the XML description in the metadata.

Through the service 206, the writers freeze the activity of the corresponding applications and the requestor 208 then instructs the service 206 to create shadow copies or one or more virtual volumes. After the snapshot is completed, the writers may resume activity. The backup items identified in the backup groupings are then made from the virtual volumes. After the backup is complete, the shadow copy set or virtual volume(s) may be deleted.

FIG. 3 further illustrates the concept of backup groupings. The backup groupings 302 represent exemplary views of the backup groupings associated with a particular client. In one example, when a full backup of the client is performed, the backup groupings 326 may be generated dynamically. The backup groupings 328 may be predetermined and may be related to the backup groupings needed to preserve a state of the client.

The content of the backup groupings 328 may be determined dynamically based in part on which writers are active on the client. Thus, defining the content of backup groupings can occur dynamically. In one embodiment, previously identified writers are associated with certain backup groupings. Writers 324 populate the backup grouping 310. The placement of a writer within the backup groupings may be determined by a type of the writer.

With reference to the backup groupings 328, the backup groupings 306, 308, 310, 312, 314, and 316 are system backup groupings and may include operating system writers and writer components. Because many components of the system backup groupings 328 have interdependencies, it is preferable to back up all of the system's backup groupings at the same time. This ensures that the client can be restored in a consistent manner should restoration be required. In one example, at least the backup groupings 310, 312, and 314 should be backed up together.

The backup groupings of the requestor may be predefined and be associated with writers that have a particular type. Alternatively, the backup groupings may be populated dynamically. When the writers of a client are enumerated or identified, writers of the same type become writers in a particular backup grouping. In other words, the components of a particular backup grouping may be populated dynamically and are based on which writers of the client are active. Thus, the writers associated with a particular backup grouping have the same type. For example in FIG. 3, the writers 324 each have the same type and are components of the backup grouping 310. If a writer for a particular application or service is not available (i.e, inactive or nonexistent), the appropriate files may be backed up via the file system when the corresponding volume(s) are selected for backup. For a given backup operation, some of the backup groupings may include active writers while others may not include any writers.

The content of the backup groupings 328 may be determined dynamically based in part on which writers are active on the client. Thus, defining the content of backup groupings can occur dynamically. In one embodiment, previously identified writers are associated with certain backup groupings. The placement of a writer within the backup groupings may be determined by a type of the writer.

In one example, writers 324 populate the backup grouping 310. The component 313, however, which is also included in the backup grouping 310 along with the writers 324, does not have a writer in this example. Other components in other backup groupings, such as the component 305 and the component 318, do not have a writer in one example. These components are backup up together with the components of the corresponding backup grouping to ensure that the backup grouping is backed up as a consistent unit. For example, all of the components in the backup grouping 310 are backed up together even though the component 313 is not associated with a writer. Components of a backup grouping that do not have a writer may be, for example, an application, a set of files that should be backed up all together, and the like.

Figure 4:
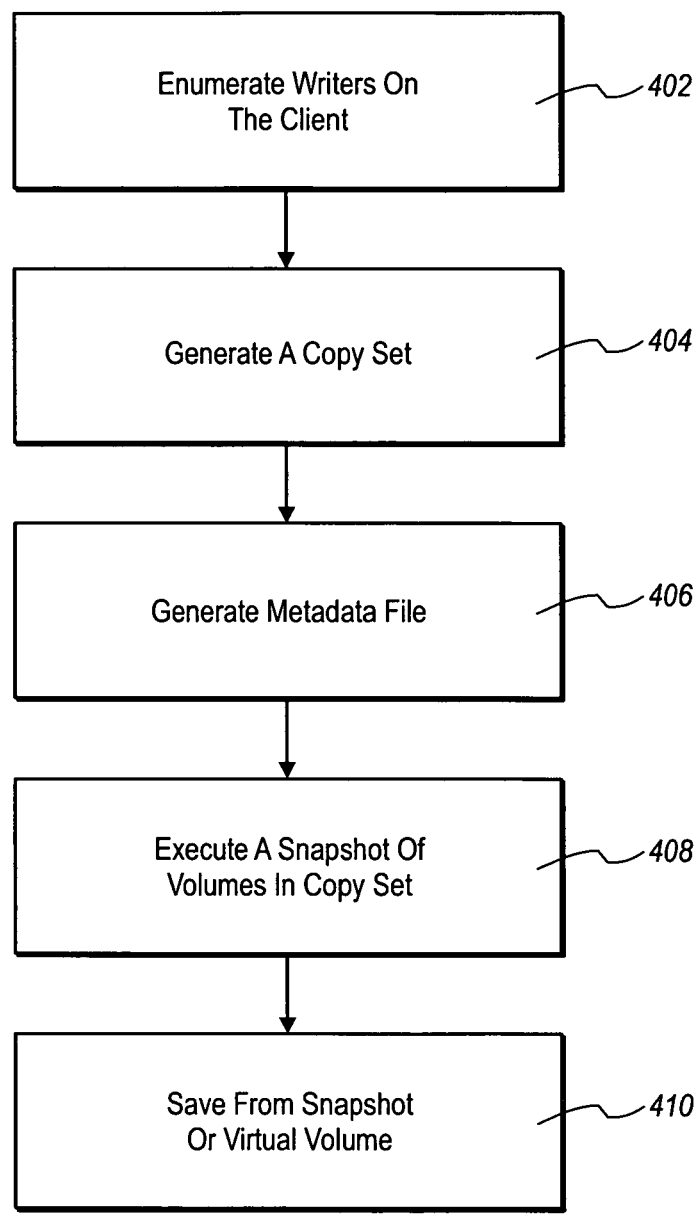
FIG. 4 is an exemplary flow chart for backing up data.

FIG. 4 illustrates an exemplary method for backing up a client. The snapshot or virtual volume for a backup operation may be used in varying levels. The snapshot may be used to perform a full backup of an entire volume or of a backup grouping. The type of backup may also vary. For example, an incremental backup may be performed for certain backup groupings. When a backup grouping containing writers is being backed up, however, a full backup of all of the writers in the backup grouping is typically performed to preserve a state of the client. In some instances, one or the writers of the backup grouping may not be backed up. This can occur, for example, when the data associated with that writer has not changed. Performance of the backup can therefore be improved, particularly if the application identified by the writer is large. In other words, refraining from backing up a large application that has not changed can improve backup performance. If the data of the application has changed, however, a full backup of the application is typically performed.

In this example, a requestor typically begins by interfacing with the copy service to enumerate the writers 402 that are currently active on the client. The writers that are active on a client can be discovered dynamically. The content of the backup groupings can be populated dynamically in this case based on the discovered writers.

After the writers have been enumerated and grouped into their respective backup grouping, the requestor generates a copy set 404. The copy set is a set of volumes that need to be included as part of the snapshot of the client. The set of volumes that should be included in the snapshot are resident at the client in this example. Also, a copy set can be generated for each writer or each backup grouping independently of other writers or backup groupings. A copy set for a backup grouping is generated after the shadow copy service queries each writer in the backup grouping for information describing how the associated data should be backed up as well as information identifying data to be backed up. Applications or services that do not have a writer are backed up, for example, by walking directories and subdirectories when the corresponding volumes are selected for backup.

Next, a metadata file is generated 406 from the information obtained from the copy set. The metadata file, as previously described, is a map that identifies the items or data to be backed up as well as, in some instances, items or data that is to be excluded from the backup. The metadata file often includes instructions for an appropriate restore operation.

After the metadata file is generated, a snapshot of the relevant volumes is executed 408. A snapshot is taken for each backup grouping by the shadow copy service. Before executing the snapshot, however, the shadow copy service notifies the writers that the snapshot is going to occur, and the writers are then instructed to pause or freeze the corresponding application or service such that the data of the client can reach a consistent state by, for example, pausing new transactions, finishing current transactions, flushing the cache to disk, etc. After a consistent state is reached, the snapshot may be executed.

After the snapshot is prepared, the client's data is backed up from the snapshot (virtual volume) 410. In one example, the backup storage is updated according to changes identified in the snapshot.

To access a particular version of the client's data, the backup storage may be configured to store multiple representations of the client's data. In other words, point in time representations of the client's data can be reconstructed. Also, the shadow copy service enables a writer to release its application such that the application may continue operation even while the application is being backed up from the virtual volume. The temporary suspension of the corresponding application or service is minimal compared to taking the application offline.

By temporarily freezing the application while the snapshot is executed, all files or items that are identified in the backup grouping can be properly copied. The snapshot can therefore include files that are open. The interruption to the application is small and may not be noticed. At the same time, all items or data in the backup grouping, including open files, are properly backed up.

3. Error Handling During Backup Operations

During a backup operation, it is possible for errors to occur. In some instances, the failure of a particular writer may cause the backup of an entire backup grouping to fail or become inconsistent. FIG. 3 may be used to illustrate that a particular writer can be disabled, thereby overcoming errors for that writer and enabling other writers in the backup grouping to be successfully backed up. In one example, a writer is manually disabled by a user during an ad hoc backup operation. In another example, the backup server can be configured to automatically disable a writer for a particular client and notify a user that the writer has been disabled.

If the writer 319 fails, for example, it can be selectively disabled from the backup process. In other words, the shadow copy service 206 may enumerate the writer 319, but the writer 319 is not typically displayed to a user. The XML data associated with the writer 319, if generated, is not processed and a backup of the data identified by the writer 319 is not backed up. The data associated with the other writers of the backup grouping 314 are backed up. The writer 319 is disabled such that a failure of the entire backup of the backup grouping 314 does not occur.

The requestor sets internal directives such that all items specified by the active writers are not also backed up via the file system. Applications that do not have a writer can be backed up, in one embodiment, by walking the file system and processing each directory and sub-directory in turn.

4. Exemplary Computing Systems

The present invention extends to both methods and systems for backing up data. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a system that includes one or more clients in communication with a server that stores a backup copy of the data from the one or more clients, a method for backing up data of a client, the method comprising:
   enumerating, by a processor, writers that are associated with one or more applications that are active on a client, the writers controlling whether the one or more applications suspend operation or resume operation;
   placing the writers in backup groupings;
   designating at least some of the backup groupings for backup;
   receiving metadata from each writer that is active on the client in the designated backup groupings, wherein the metadata of a particular writer identifies specific data to be backed up for the particular writer;

requesting a snapshot of the client for the designated backup groupings;

causing the writers in the designated backup groupings to suspend operation of each corresponding application while executing the snapshot;

generating a shadow copy set for each backup grouping, wherein each shadow copy set identifies at least one volume to be included in the snapshot of the client;

causing the writers to resume operation of each application after the snapshot is executed; and backing up the specific data of the backup groupings of the client identified in the metadata received from each writer from the snapshot executed on the client, wherein data for at least all active writers in the designated backup groupings are backed up.

2. A method as defined in claim 1, further comprising:

causing each application to pause new transactions;

causing each application to finish performing current transactions; and causing any cache associated with each application to flush to disk.

3. A method as defined in claim 1, wherein open files associated with the writers are included in the snapshot of the client.

4. A method as defined in claim 1, further comprising requesting deletion of the snapshot.

5. A method as defined in claim 1, wherein the data is one or more of user data, system data, an operating system, an application and a service.

6. A method as defined in claim 5, wherein the data is an operating system, backing up enough of the one or more backup groupings such that a state of the client is preserved in the backup of the data.

7. In a system that includes one or more clients having data to be backed up, a method for backing up data, the method comprising:

requesting, by a processor, a service to enumerate writers and to collect metadata for each enumerated writer, each writer being associated with one or more applications that are active, the writers controlling whether the one or more applications suspend activity or resume activity;

placing the writers in backup groupings;

designating at least a portion of the backup groupings for backup;

causing the writers in the designated backup groupings to at least temporarily suspend activity of applications or services associated with the writers by:

causing each application or service to finish current transactions;

causing each application or service to pause new transactions; and flushing any cache associated with the application or the service;

instructing the service to create one or more virtual volumes for volumes identified in the metadata received from each writer in the designated backup groupings, wherein data for at least all active writers in the designated backup groupings are included in the one or more virtual volumes;

causing the writers to resume activity for the application or services associated with the writers after the one or more virtual volumes are created; and backing up the data from the one or more virtual volumes.

8. A method as defined in claim 7, further comprising identifying if the client supports a shadow copy set for volumes identified in the metadata.

9. A method as defined in claim 7, wherein instructing the service to create one or more virtual volumes for volumes identified in the metadata received from each writer further comprises including open files in the one or more virtual volumes.

10. A method as defined in claim 7, further comprising deleting the one or more virtual volumes.

11. A method as defined in claim 7, further comprising selecting one or more backup groupings to backup, wherein each backup grouping includes writers having a particular type.

12. A method as defined in claim 11, wherein the metadata of each writer identifies items to be backed up for each writer, further comprising walking items identified in the metadata.

13. A method as defined in claim 12, wherein the data is an operating system, further comprising walking each backup grouping needed to preserve a state of the client in the backup of the operating system.

14. A method as defined in claim 7, further comprising disabling a writer that fails to backup.

15. A computer readable medium having computer executable instructions for performing the method of claim 7.

16. A method for backing up data of a client, the method comprising:

dynamically defining, by a processor, writers of backup groupings, wherein the writers of each backup grouping have a same type, each writer being associated with one or more applications that are active, the writers controlling whether the one or more applications suspend activity or resume activity;

placing the writers into backup groupings, wherein the writers are placed into the backup groupings to ensure that data associated with the writers in each of the backup groupings are backed up at the same time;

selecting one or more backup groupings to backup, wherein at least data for all active writers in the selected one or more backup groupings are included for the backup;

receiving metadata from the writers included in the selected one or more backup groupings, wherein the metadata of each writer identifies, for each writer, (i) items to be backed up, (ii) items to be excluded from the backup, and (iii) a restore method;

causing each application associated with writers in the selected one or more backup groupings to prepare for backup by requesting the generation of one or more virtual volumes for the data associated with the selected one or more backup groupings identified in the metadata;

causing each application associated with each writer in the selected one or more backup groupings to at least temporarily suspend operations while the one or more virtual volumes are generated, wherein the data associated with the selected one or more backup groupings are stored on one or more volumes; and performing a backup of the selected one or more backup groupings from the one or more virtual volumes.

17. A method as defined in claim 16, wherein defining content of backup groupings dynamically further comprises enumerating active writers on the client.

18. A method as defined in claim 16, further comprising disabling each writer of each backup grouping that causes the backup of the corresponding backup groupings to fail.

19. A method as defined in claim 16, wherein causing each application associated with writers in the selected one or more backup groupings to prepare for backup by requesting the generation of one or more virtual volumes for the one or more volumes identified in the metadata further comprises generating a snapshot for applications associated with writers in a particular backup grouping.

20. A method as defined in claim 19, wherein causing each application associated with each writer to suspend operations while the one or more virtual volumes are generated further comprises:
- causing a shadow copy service to pause new transactions;
- causing the shadow copy service to finish current transactions; and
- causing the shadow copy service to flush any cache.

21. A method as defined in claim 16, further comprising instructing the writers to resume activity after the one or more virtual volumes are created.

22. A method as defined in claim 16, further comprising requesting the deletion of the one or more virtual volumes after backing up the data identified by the selected one or more backup groupings.

\* \* \* \* \*